US011919024B2

(12) United States Patent
Godbout

(10) Patent No.: US 11,919,024 B2
(45) Date of Patent: Mar. 5, 2024

(54) WEEPING WALL

(71) Applicant: Lucien Godbout, St-Augustin de Desmaures (CA)

(72) Inventor: Lucien Godbout, St-Augustin de Desmaures (CA)

( * ) Notice: Subject to any disclaimer, the term of this patent is extended or adjusted under 35 U.S.C. 154(b) by 40 days.

(21) Appl. No.: 17/626,257

(22) PCT Filed: Jul. 12, 2019

(86) PCT No.: PCT/CA2019/050964
§ 371 (c)(1),
(2) Date: Jan. 11, 2022

(87) PCT Pub. No.: WO2021/007644
PCT Pub. Date: Jan. 21, 2021

(65) Prior Publication Data

US 2022/0274128 A1 Sep. 1, 2022

(51) Int. Cl.
*B05B 17/08* (2006.01)

(52) U.S. Cl.
CPC .................................. *B05B 17/085* (2013.01)

(58) Field of Classification Search
CPC .............................. B05B 17/08; B05B 17/085
USPC ...................................................... 239/17, 23
See application file for complete search history.

(56) References Cited

U.S. PATENT DOCUMENTS 3,702,172 A 11/1972 Hawkins
4,747,538 A 5/1988 Dunn et al.
5,167,368 A 12/1992 Nash
5,188,773 A 2/1993 Chen et al.
5,288,018 A 2/1994 Chikazumi
5,381,956 A * 1/1995 Robinson ................ B05B 17/08 239/22
6,170,094 B1 1/2001 Weise et al.
6,575,437 B2 6/2003 Fischer et al.
6,695,221 B2 2/2004 Lussier
6,731,429 B2 5/2004 Lunde
6,971,586 B2 12/2005 Fisher
7,232,076 B2 6/2007 Harrison et al.
7,775,457 B2 8/2010 Schnuckle
2003/0228956 A1* 12/2003 Paci .................. A63B 69/0048 482/37

(Continued)

FOREIGN PATENT DOCUMENTS

CN 202086829 U 12/2011

*Primary Examiner* — Christopher S Kim
(74) *Attorney, Agent, or Firm* — Rogue.law; Laura Schneider

(57) ABSTRACT

A weeping wall for receiving a continuous flow of a flowable substance. The weeping wall comprises: a wall body including a substantially vertical wall section having a flow surface; a flowable substance inlet defined at an upper end of the substantially vertical wall section, with the flowable substance continuously flowing therefrom and downwardly onto the flow surface; at least one mobile deflector movably engaged to the flow surface and projecting therefrom, the at least one mobile deflector being selectively movable relative to the flow surface to modify the flow path of the flowable substance on the flow surface; and a flowable substance outlet defined at a lower end of the substantially vertical wall section with the flowable substance flowing continuously therein after running down onto the flow surface.

15 Claims, 7 Drawing Sheets

(56) References Cited

U.S. PATENT DOCUMENTS

| | | | |
|---|---|---|---|
| 2012/0111554 | A1 | 5/2012 | Wilson |
| 2018/0049448 | A1 | 2/2018 | Bond et al. |

* cited by examiner

WEEPING WALL

CROSS REFERENCE TO RELATED APPLICATIONS

This application is a U.S. national phase application under 35 U.S.C. § 371 of PCT Application No. PCT/CA2019/050964 and entitled "WEEPING WALL," which is hereby incorporated herein by reference for all proper purposes.

TECHNICAL FIELD OF THE INVENTION

The present invention relates to the field of ornamental walls. More particularly, it relates to a weeping wall which can be selectively reconfigurable to modify the flow path of a flowable substance running down a flow surface thereof, thereby modifying the overall appearance of the weeping wall.

BACKGROUND

Weeping walls, such as water walls and the like, are known in the art for providing aesthetically pleasing environments in both in private and public settings. For example and without being limitative, water walls can often be found in private backyards or homes or in public places such as parks, esplanades, walkways, theatres, shopping malls, museums, golf courses, etc.

Such water walls commonly include a vertical wall with a flow surface onto which a liquid such as water flows down, thereby generating a water flow that is both aesthetically pleasing and relaxing for people watching the water drip. In order to increase the aesthetic appearance of the water wall, the flow surface can be textured, such that the water flows according to an irregular pattern and increases the water splashing noise, which can be relaxing.

Known water walls however tend to suffer from several drawbacks. Amongst other, known water walls typically include a flow surface having a static configuration. Hence, even in the case where deflectors are provided to provide texture to the flow surface, such deflectors are static (i.e. they are maintained in the same position and/or orientation over time), thereby resulting in a water flow that can be irregular, but remains unchanged over time. Such static configuration of the flow surface thereby limits the possible uses and operating possibilities of the water walls in both private and public settings.

In view of the above, there is a need for improved weeping walls which, by virtue of their design and components, would be able to overcome or at least minimize some of the above-discussed prior art concerns.

SUMMARY OF THE INVENTION

In accordance with a first general aspect, there is provided a weeping wall for receiving a continuous flow of a flowable substance. The weeping wall comprises: a wall body including a substantially vertical wall section having a flow surface; a flowable substance inlet defined at an upper end of the substantially vertical wall section, with the flowable substance continuously flowing therefrom and downwardly onto the flow surface; at least one mobile deflector movably engaged to the flow surface and projecting therefrom, the at least one mobile deflector being selectively movable relative to the flow surface to modify the flow path of the flowable substance on the flow surface; and a flowable substance outlet defined at a lower end of the substantially vertical wall section with the flowable substance flowing continuously therein after running down onto the flow surface.

In accordance with another general aspect, there is also provided a weeping wall comprising: a flow surface receiving a continuous flow of flowable substance running downwardly thereon; a flowable substance inlet positioned at an upper end of the flow surface and releasing a flow of the flowable substance; a flowable substance outlet positioned at a lower end of the flow surface and receiving a flow of the flowable substance, the flowable substance outlet being in fluid communication with a reservoir collecting and storing the flowable substance; a pump constantly moving the flowable substance from the reservoir to the flowable substance inlet; and at least one mobile deflector movably engaged to the flow surface and projecting therefrom, each one of the at least one mobile deflector being sized and shaped to disrupt the flow of flowable substance dripping down the flow surface and being selectively movable relative to the flow surface to modify the flow path of the flowable substance on the flow surface.

In an embodiment, each one of the at least one mobile deflector is selectively displaceable at least one of vertically and horizontally along the flow surface.

In an embodiment, each one of the at least one mobile deflector is selectively rotatable about the flow surface.

In an embodiment, each one of the at least one mobile deflector is magnetically held in place on the flow surface.

In an embodiment, the wall body includes a magnetic material layer extending along at least a portion of the substantially vertical section and wherein each one of the at least one mobile deflector includes a magnet.

In an embodiment, the magnetic material layer is made of non-corrosive magnetic material and has a forward face defining the flow surface of the substantially vertical wall section of the wall body.

In an embodiment, the magnetic material layer has a forward face and includes a layer of non-corrosive, non-magnetic material extending along the forward face, the layer of non-corrosive, non-magnetic material defining the flow surface of the substantially vertical wall section of the wall body.

In an embodiment, the wall body includes a core and an automatic deflector repositioning system embedded within the core along at least a section of the substantially vertical wall section. The automatic deflector repositioning system cooperates with at least a subset of the at least one deflector mounted to the flow surface, to move at least one corresponding deflector on the flow surface.

In an embodiment, the core is made of non-magnetic material and the automatic deflector repositioning system includes magnetic elements displaceable, to magnetically move the corresponding one of the at least one deflector on the flow surface.

In an embodiment, the flowable substance is water.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
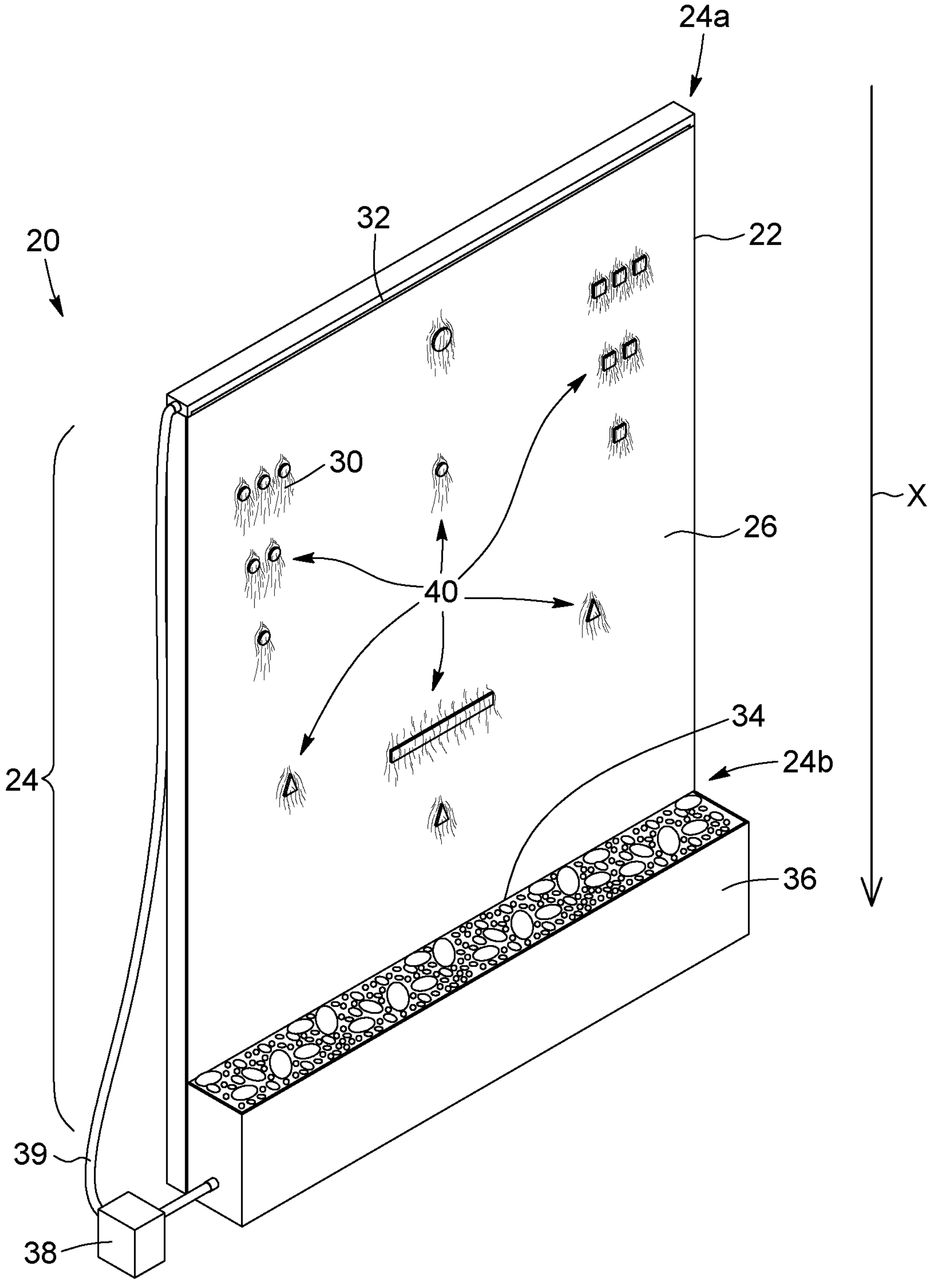
FIG. 1 is an isometric schematic representation of the weeping wall, in accordance with a first embodiment and showing a pump system of the weeping wall.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the weeping wall and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the weeping wall, as will be briefly explained herein and as can be easily inferred herefrom by a person skilled in the art. Moreover, it will be appreciated that positional descriptions such as “above”, “below”, “left”, “right” and the like should, unless otherwise indicated, be taken in the context of the figures and should not be considered limiting.

To provide a more concise description, some of the quantitative and qualitative expressions given herein may be qualified with the terms “about” and/or “substantially”. It is understood that whether the terms “about” and “substantially” are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

In the course of the present description, the term “weeping wall” is used to define an ornamental wall having at least a substantially horizontal section defining a flow surface onto which a liquid, such as, for example and without being limitative, water or the like, or any other flowable substance, such as, for example and without being limitative, sand or the like, can flow downwardly. In the course of the present description, the embodiments shown and described can refer to water walls (i.e. a weeping wall where the flowable substance is in liquid form and is water). One skilled in the art will however understand that, in alternative embodiments (not shown), any other structure configured to receive a substance that flows freely onto the flow surface of the substantially vertical section of the wall could be encompassed in the term “weeping wall”. It will also be understood that, in the present application, when the term “water” is used, it is used as an example of a flowable substance that could be used to flow on the flow surface of the weeping wall and should not be construed restrictively. Even when, water is described as the substance used in the weeping wall, it will be understood that any other substance that flows freely and could be used to flow on the flow surface of the weeping wall could replace water in the embodiments shown.

In the course of the present description, the term “selectively movable” is used to refer to elements being movable periodically and resulting from a specific force being applied thereon, a manipulation of the element or any other action causing the movement of the element, rather than elements being movable continuously in a continuous motion.

Figure 2:
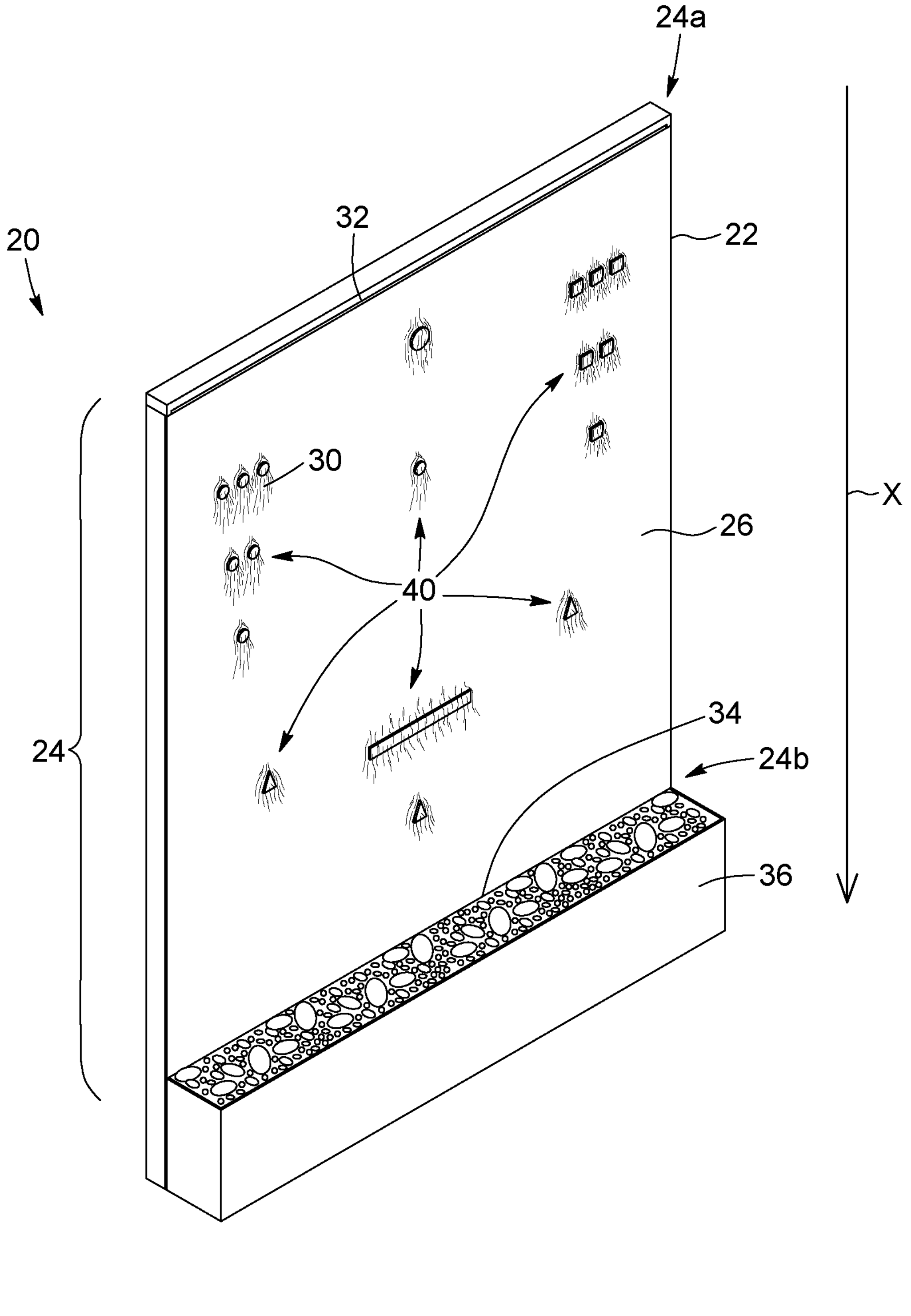
FIG. 2 is an isometric view of the weeping wall of FIG. 1, with the schematic elements removed.
Figure 3:
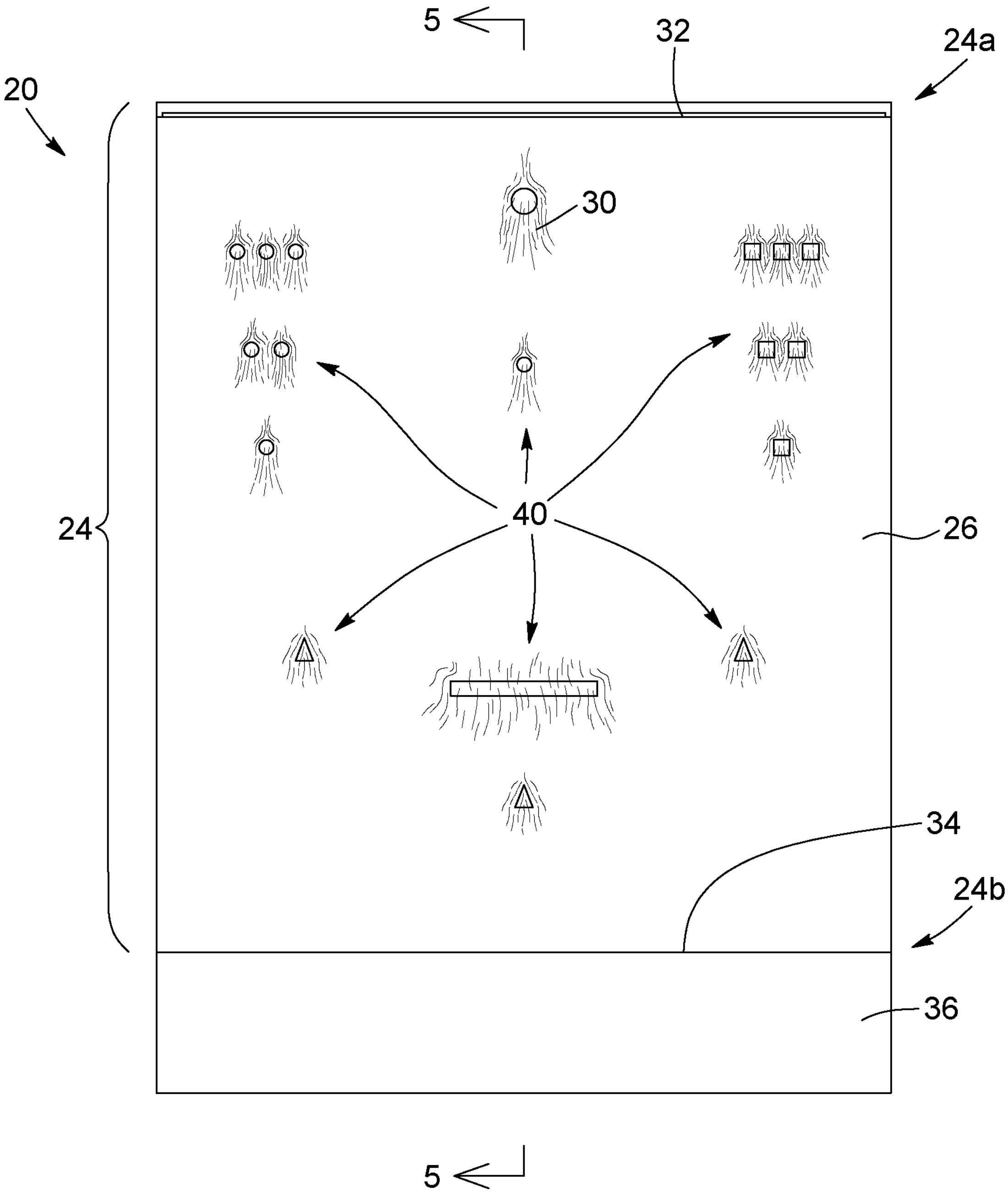
FIG. 3 is a front elevation view of the weeping wall of FIG. 2.

Referring generally to FIGS. 1 to 3, in accordance with one embodiment, there is provided a weeping wall 20 having a wall body 22 including a substantially vertical section 24 defining a flow surface 26 onto which a flowable substance 30 (e.g. water) runs downwardly.

In the embodiment shown, the weeping wall 20 is a water wall, where the flowable substance 30 is water. As mentioned above, one skilled in the art will however understand that other flowable substances 30 (e.g. a liquid different than water, a flowable granular material such as sand, or the like) could be used in the weeping wall 20, to flow along the flow surface 26 of the substantially vertical wall section 24.

In the embodiment shown in FIGS. 1 to 3, the wall body 22 is limited to a substantially vertical section 24, but one skilled in the art will understand that, in alternative embodiments (not shown) the wall body 22 could include additional sections (not shown) adjacent to the substantially vertical section 24 and onto which the flowable substance 30 can flow downwardly, with the additional sections (not shown) being positioned either upstream or downstream of the substantially vertical section 24. One skilled in the art will also understand that the flow surface 26 of the substantially vertical section 24 can have any inclination which allows contact of the flowable substance 30 therewith and enables the flowable substance 30 to flow downwardly thereon. For example and without being limitative, in an embodiment, the flow surface 26 has an inclination of between about 0° and about 45° with regard to a vertical axis X. In an alternative embodiment, the flow surface 26 has an inclination of between about 0° and about 10° with regard to the vertical axis X. Moreover, even though the substantially vertical section 24 of the embodiment shown defines a flow surface 26 having a constant inclination over the entire length of the substantially vertical surface 24, one skilled in the art will understand that, in alternative embodiments (not shown), the flow surface 26 of the substantially vertical section 24 could include different sections (not shown) defined successively and each having a different inclination. In such an embodiment (not shown), the combination of the successive sections would define the flow surface 26.

In the embodiment shown, the flow surface 26 is the forward face of the wall body 22, along the substantially vertical section 24. One skilled in the art will however understand that, in alternative embodiments (not shown), the flow surface 26 could be the rearward face or one of the side faces of the wall body 22. In another alternative embodiment (not shown), more than one flow surface 26 could be provided along the substantially vertical section 24.

The weeping wall 20 includes a flowable substance inlet 32 positioned upstream of the substantially vertical section 24, at an upper end of the wall body 22. The flowable substance 30 flows from the flowable substance inlet 32 and onto the flow surface 26, to generate a constant flow of the flowable substance 30 onto the flow surface 26.

In the embodiment shown, a single continuous flowable substance inlet 32 is positioned at an upper end 24a of the substantially vertical section 24 and extends substantially along the entire with of the flow surface 26. One skilled in the art will however understand that, in alternative embodiments (not shown), the flowable substance inlet 32 could be positioned further above the substantially vertical section 24. Moreover, in other alternative embodiments (not shown), the flowable substance inlet 32 could extend along only a portion of the width of the flow surface 26, thereby releasing the flowable substance 30 only on a corresponding portion thereof. In another alternative embodiment (not shown), the flowable substance inlet 32 could be discontinuous, with multiple sections each extending along a portion of the width of the flow surface 26.

The weeping wall 20 further includes a flowable substance outlet 34 positioned downstream of the substantially vertical section 24, at a lower end of the wall body 22. The flowable substance outlet 34 is configured to receive and collect the flowable substance 30 after it has dripped down the flow surface 26.

In the embodiment shown, a single continuous flowable substance outlet 34 is positioned at a lower end 24*b* of the substantially vertical section 24 and extends substantially along the entire width of the flow surface 26. One skilled in the art will once again however understand that, in alternative embodiments (not shown), the flowable substance outlet 34 could be positioned further below with regard to the substantially vertical section 24 and could extend along only a portion of the width of the flow surface 26, with the flowable substance outlet 34 substantially matching a corresponding flowable substance inlet 32 and vertically aligned therewith. In another alternative embodiment, the flowable substance outlet 34 could be discontinuous, with multiple sections each extending along a portion of the width of the flow surface 26 and substantially matching a corresponding section of the flowable substance inlet 32 and vertically aligned therewith. In other words, in an embodiment, the flowable substance outlet 34 is sized, shaped and positioned to substantially match the configuration of the corresponding flowable substance inlet 32 and thereby receive the flow of flowable substance 30 released from the flowable substance inlet 32, after it has flowed down the flow surface 26.

In an embodiment, the flowable substance outlet 34 is in fluid communication with a reservoir 36 (or sump) which allows collection and storage of the flowable substance 30. In such an embodiment, the flowable substance 30 received at the flowable substance outlet 34 is directed to the reservoir 36 (or sump) and is temporarily collected and stored therein. In an embodiment, the weeping wall 20 is self-contained, thereby not requiring a constant water intake. The weeping wall 20 recycles the flowable substance 30 from the flowable substance outlet 34 and stored in the corresponding reservoir 36 (or sump) using a pump 38 and a pipe arrangement 39 connecting the reservoir 36 with the flowable substance inlet 32. The pump 38 pumps the flowable substance 30 from the reservoir 36 and generates sufficient pressure to drive the flowable substance 30 upwardly into the pipe arrangement 39 to provide a constant flow of flowable substance 30 pouring out of the flowable substance inlet 32 and thereby generate a constant and uniform flow of flowable substance 30 on the flow surface 26 of the weeping wall 20. Several types and models of pumps 38 are known in the art to perform the pumping of the flowable substance 30 from the reservoir 36 and generating the sufficient pressure to drive the flowable substance 30 upwardly into the pipe arrangement 39 and provide a constant flow of flowable substance 30. One skilled in the art will understand that, in alternative embodiments (not shown) a different assembly than the one described above, such as, for example and without being limitative, an auger assembly, could also be used to constantly move the flowable substance 30 from the reservoir 36 to the flowable substance inlet 32.

In an embodiment, a collection recipient (not shown) is defined at the upper end 24*a* of the substantially vertical section 24, with the overflow from the reservoir flowing through the flowable substance inlet 32. One skilled in the art will understand that the collection recipient is sized and shaped to contain a sufficient amount of flowable substance 30 to prevent turbulence of the flow of flowable substance 30 flowing from the flowable substance inlet 32 and provide a uniform flow of flowable substance on the flow surface 26. In such an embodiment, the pump 38 can pump the flowable substance 30 from the reservoir 36 and into the collection recipient (not shown) to create an overflow therein and thereby create a flow of flowable substance 30 from the flowable substance inlet 32.

The weeping wall 20 further includes at least one mobile deflector 40 movably engaged to the flow surface 26 and projecting therefrom. The deflector 40 is sized and shaped to disrupt the flow of flowable substance 30 dripping down the flow surface 26, when the flowable substance 30 contacts the deflector 40, thereby modifying the flow path of the flowable substance 30 and generating splashing effects where the flowable substance 30 splashes away from the flow surface 26. In other words, the mobile deflector 40 has a thickness T, with an upstream wall 42 projecting from the flow surface 26 of a distance corresponding to the thickness T and receiving a flow of flowable substance 30 thereon. When contacting the upstream wall 42, the flowable substance 30 flowing down the flow surface 26 is deflected away from the flow surface 26, thereby generating the desired splashing effect. In an embodiment, the splashing effect created by contact of the flowable substance 30 with the deflector 40 can mimic the appearance of water flowing out of the flow surface 26, through the deflector 40.

Figure 4A:
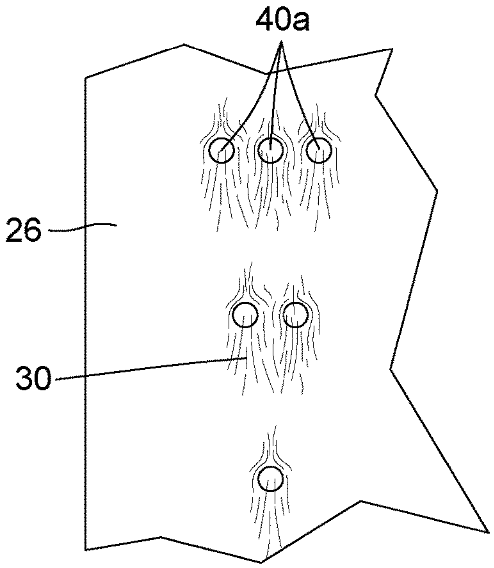
FIG. 4A to 4C are enlarged views of sections of the flow surface of the weeping wall of FIG. 3, each showing deflectors having different sizes and shapes.
Figure 4B:
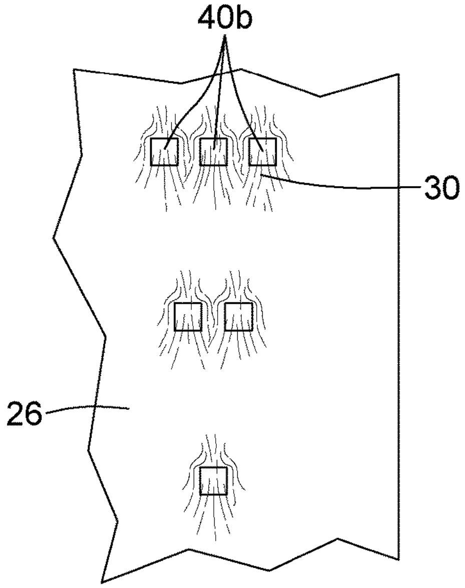
Figure 4C:
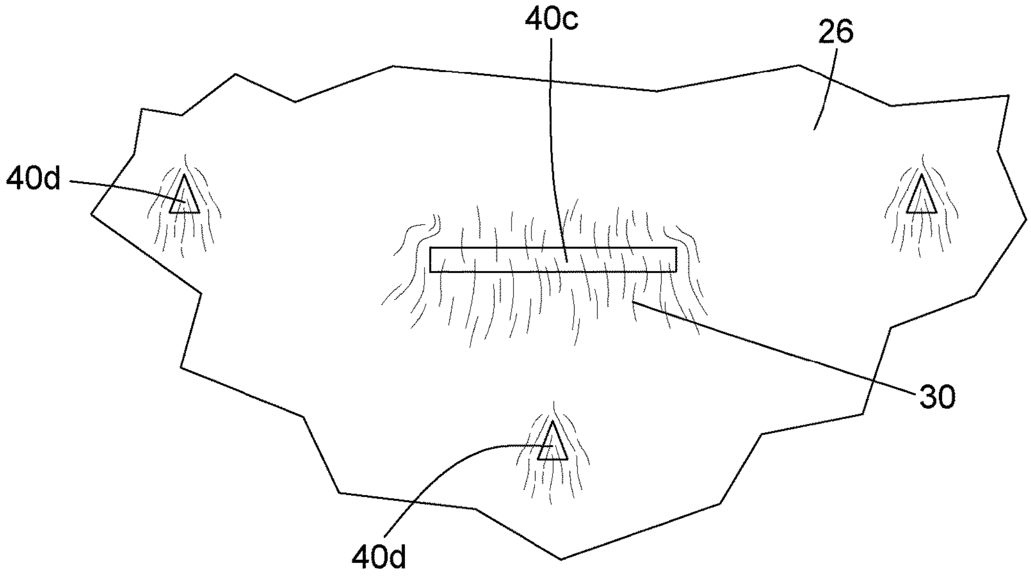

As better seen in FIGS. 4A to 4C, the deflectors 40 can have different size, shape and/or configuration. For example and without being limitative, the deflectors 40 can be circular-shaped deflectors 40a as shown in FIG. 4A, square-shaped deflectors 40b as shown in FIG. 4B, rectangular-shaped deflectors 40c or triangular-shaped deflectors 40d as shown in FIG. 4C, etc. One skilled in the art will easily understand that, the size, shape and/or configuration of the deflectors 40 are not limited to the embodiments shown in the Figures and that the deflectors 40 could have any size, shape and/or configuration which allow the desired modification of the flow path of the flowable substance 30 on the flow surface 26. The deflectors 40 can have a regular shape, as shown in FIGS. 4A to 4C or an irregular shape. Moreover, even though the upstream wall 42 of the deflectors 40 shown in FIGS. 4A to 4C projects substantially perpendicular to the flow surface 26, one skilled in the art will understand that, in alternative embodiments (not shown), the upstream wall 42 of the deflector 40 could be angled relative to the flow surface 26 or have a different configuration, such as, for example and without being limitative a convex or a concave configuration.

In an embodiment, multiple mobile deflectors 40 are movably engaged to the flow surface 26. Depending on the position, configuration, number and dimensions of the deflectors 40, the flowable substance 30 falling along the flow surface 26 of the weeping wall 20 will have a different flow path.

In order to allow easy modification of the flow path, each deflector 40 is movably engaged to the flow surface 26, such that it can easily be selectively moved according to the flow surface 26, either manually by a user or through an automatic moving mechanism, as will be described in more details below.

Figure 5A:
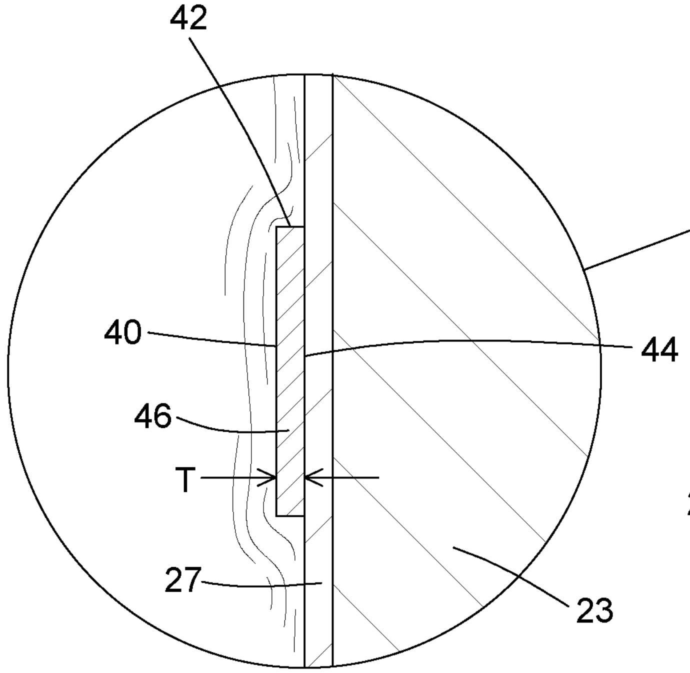
FIG. 5*a* is enlarged view of section of the weeping wall of FIG. 5.
Figure 5:
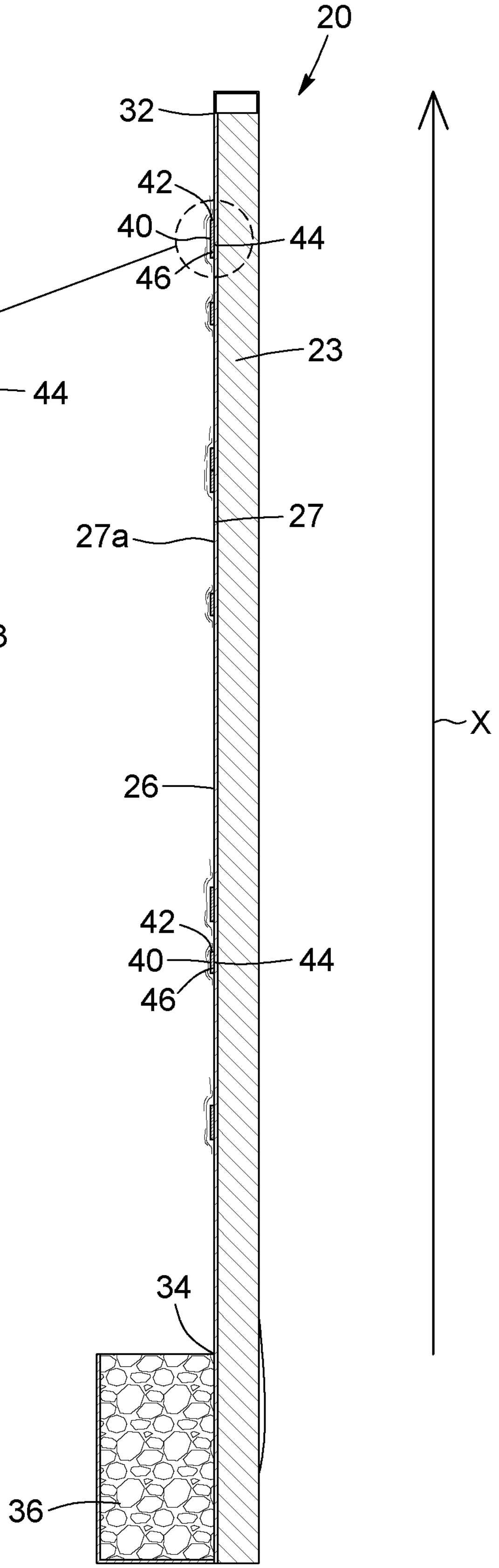
FIG. 5 is a cross-sectional view of the weeping wall of FIG. 2, taken along lines 5-5 in FIG. 3.

Referring to FIGS. 5 and 5*a*, in the embodiment shown, the movable engagement between each mobile deflector 40 and the substantially vertical section 24 of the weeping wall 20 is embodied by the deflector 40 being magnetically held in place on the flow surface 26. In the embodiment shown, the wall body 22 includes a core 23 made of non-magnetic material, such as, for example wood, cement, plastic or the like. Along the substantially vertical section 24, the wall body 22 also includes a magnetic material layer 27 lining the core 23, with the flow surface 26 being defined along a forward face 27*a* of the magnetic material layer 27. In an embodiment, the magnetic material layer 27 is made of non-corrosive magnetic material, such as, for example and without being limitative, ferritic stainless steel (e.g. AISI 430), martensitic stainless steel (e.g. AISI 410), or the like, in order to prevent corrosion of the magnetic material layer 27 over time when the flowable substance 30 being used is water. One skilled in the art will understand that, in alternative embodiments, other non-corrosive magnetic material could also be used.

In another embodiment (not shown), the magnetic material layer 27 could also include a layer of non-corrosive, non-magnetic material, such as a plastic film, a varnish, a layer of austenitic stainless steel (e.g. AISI 430) or the like, along the forward face 27*a*. In such an embodiment, the magnetic material layer 27 can be made of corrosive ferromagnetic material, such as steel or the like, to allow the deflector 40 to magnetically connect to the flow surface 26, while still preventing corrosion of the magnetic material layer 27 over time when the flowable substance 30 being used is water since the magnetic material layer 27 is insulated from the flowable substance 30 flowing on the flow surface by the thin layer of non-corrosive, non-magnetic material.

In the course of the present description, the term "non corrosive" is used to refer to a material which exhibit high resistance properties to corrosion when fluid such as water is used as flowable substance 30 continuously running onto it.

Each mobile deflector 40 includes a magnet 46 in a rear portion thereof (i.e. a magnet 46 extending along at least a portion of a rear surface 44 of the mobile deflector 40). Hence, when the deflector 40 is laid onto the flow surface 26, the deflector 40 is magnetically held in place on the flow surface 26 (i.e. the deflector 40 is magnetically maintained in a stable status and is prevented from a change in positioning and/or orientation with regard to the flow surface 26 by the magnetic force holding the deflector 40 in place). In an embodiment, the magnet 46 covers the entire rear surface 44 of the mobile deflector 40. One skilled in the art will however understand that, in an alternative embodiment, the magnet 46 could cover only a portion of the rear surface 44 of the mobile deflector 40.

One skilled in the art will understand that, in alternative embodiments (not shown) other arrangements or assemblies could be used to provide the movable engagement between each mobile deflector 40 and the substantially vertical section 24 of the weeping wall 20. For example and without being limitative, the mobile deflectors 40 could be mounted onto the flow surface 26 using bolts (not shown) threadable into threads defined in the substantially vertical section 24 and hidden under removable covers (not shown) integrated into the flow surface 26, the mobile deflectors 40 could selectively move along slots (not shown) defined in the flow surface, for example and without being limitative using a pin and slot mechanism (not shown), etc. In other alternative embodiments (not shown) the mobile deflectors 40 could be rotatably mounted, with each mobile deflector 40 being selectively rotatable between different angular orientations each providing a different flow path for the flowable substance 30 flowing down the flow surface and engaging the section of the deflector 40 operating as the upstream wall 42 of the deflector 40 when the deflector 40 is in the corresponding angular orientation, for example using a pin (not shown) mounted to the substantially vertical section 24 of the weeping wall 20 and onto which the deflector 40 can be rotated. In order to prevent continuous rotation of the deflectors 40, but rather only allow selective rotation between selected angular orientations, when desired, the rear surface 44 of the deflector 40 can for example be selectively pressed against the flow surface 26, to provide sufficient friction therebetween to maintain the deflector in a constant angular orientation or released from the flow surface 26 to decrease the friction therebetween and allow rotation of the deflector 40, for example by moving the pin (not shown) between a locked position and an unlocked position. It will be understood that other mechanisms which enables the deflectors 40 to be temporally held in a constant position and/or orientation on the flow surface 26, while remaining selectively movable (i.e. movable to a different position and/or rotatable in a different angular orientation) when reconfiguration of the deflectors regarding to the flow surface 26 is desired, could also be used.

Figure 6:
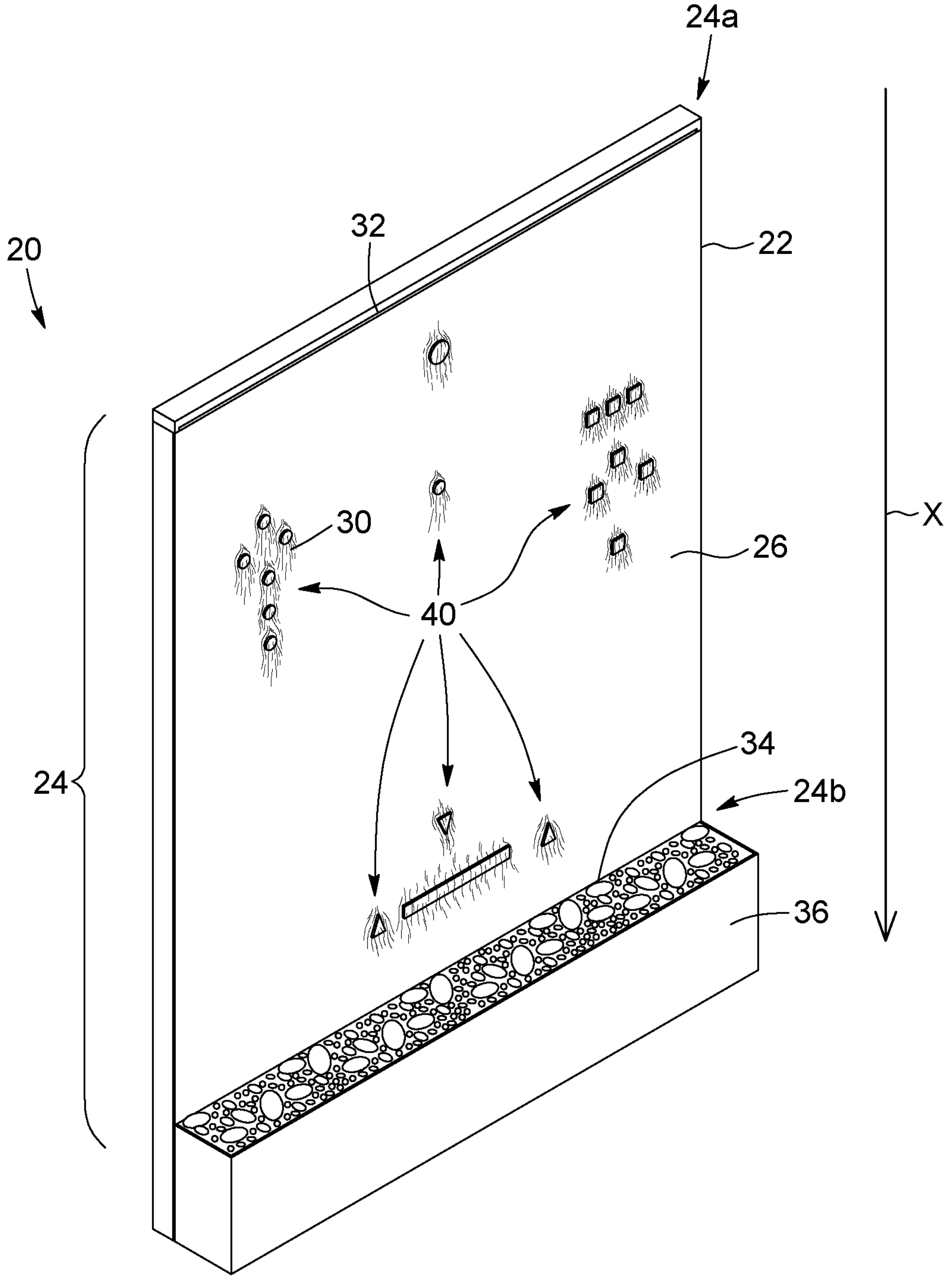
FIG. 6 is an isometric view of the weeping wall, in accordance with an alternative embodiment where the deflectors are reconfigured on the flow surface.

FIG. 6 shows an alternative embodiment of the weeping wall 20 where the deflectors 40 are reconfigured with regard to the embodiment of the weeping wall 20 shown in FIG. 3. Indeed, in FIG. 6, the circular-shaped deflectors 40*a*, square-shaped deflectors 40*b* and the rectangular-shaped deflectors 40*c* are moved to a different position than the previous position shown in FIG. 3. Moreover, the triangular-shaped deflectors 40*d* are rotated to a different angular orientation than the previous angular orientation shown in FIG. 3. The reconfiguration of the deflectors 40 results in a different flow path of the flowable substance 30 onto the flow surface 26. One skilled in the art will understand that, in alternative embodiments (not shown), only a subset of the deflectors 40 could be moved to reconfigure the deflectors 40 onto the flow surface 26.

In the embodiments shown in FIGS. 1 to 6, the selective reconfiguration of the position and/or orientation of the deflectors 40 regarding the flow surface 26 can be performed manually by a user. For example, in the embodiments shown where the movable engagement between each mobile deflector 40 and the substantially vertical section 24 of the weeping wall 20 is embodied by the deflector 40 being magnetically held in place on the flow surface 26, the manual reconfiguration can be performed simply by a user grasping and manipulating the deflectors 40 to reposition and/or rotate the corresponding deflectors 40 to a desired position and/or angular orientation on the flow surface 26, using sufficient force to temporarily overcome the magnetic force maintaining the deflector 40 in place on the flow surface 26.

Figure 7:
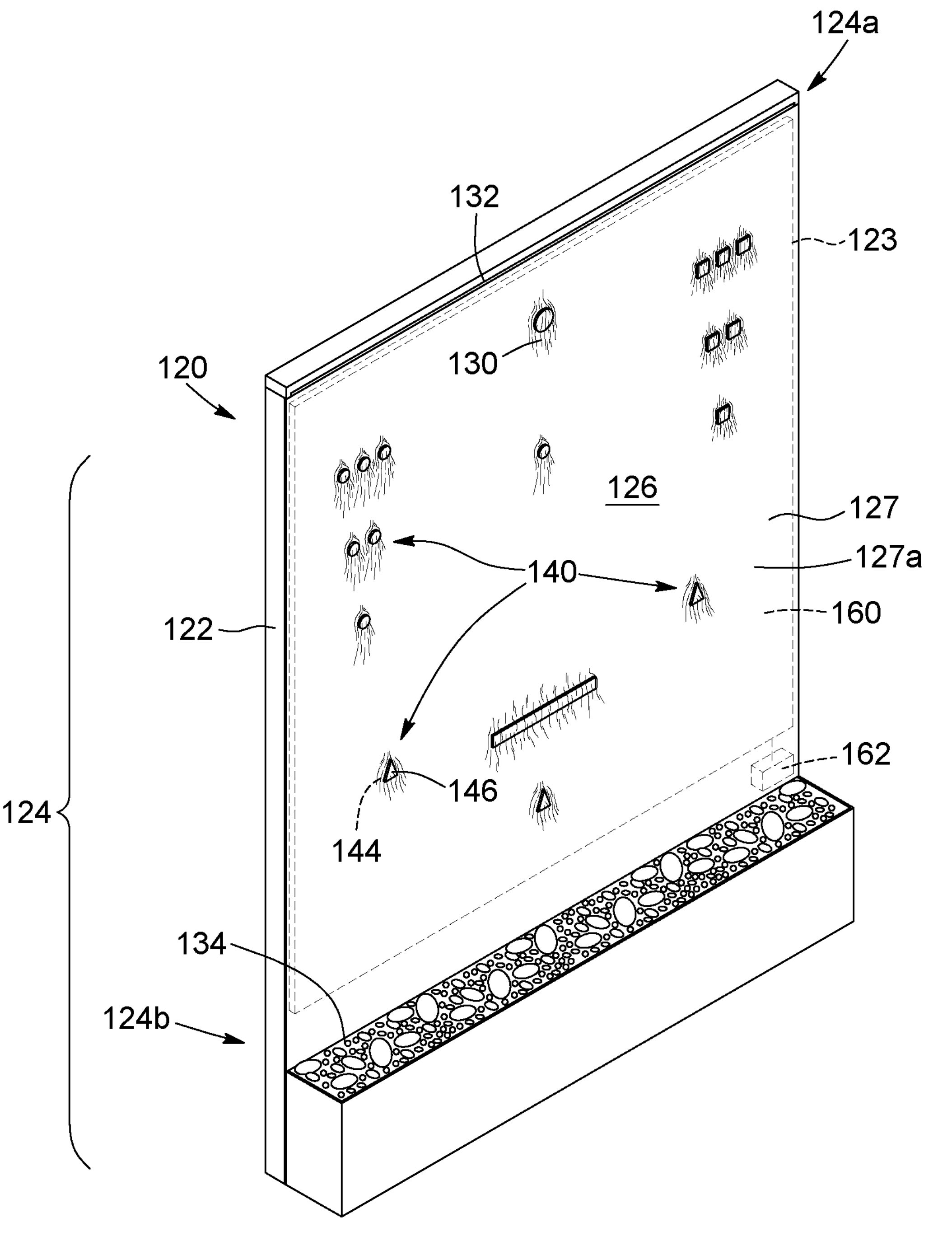
FIG. 7 is a schematic illustration of the components of a weeping wall in accordance with another alternative embodiment where the weeping wall includes an automatic deflector repositioning system.

Now referring to FIG. 7, there is shown an alternative embodiment of the weeping wall 120 wherein the features are numbered with reference numerals in the 100 series which correspond to the reference numerals of the previous embodiment.

In the embodiment shown in FIG. 7, similarly to the above described embodiments, the weeping wall 120 includes a wall body 122 having a core 123 and a substantially vertical section 124 with an upper end 124*a* and a lower end 124*b*. The forward face of the wall body 122, along the substantially vertical section 124, defines a flow surface 126, with a flowable substance inlet 132 positioned upstream of the substantially vertical section 124, at an upper end of the wall body 122 and a flowable substance outlet 134 positioned downstream of the substantially vertical section 124, at a lower end of the wall body 122.

Once again, the movable engagement between each mobile deflector 140 and the substantially vertical section 124 of the weeping wall 120 is embodied by the deflector 140 being magnetically held in place on the flow surface 126. Hence, once again, the wall body 122 includes a core 123 made of non-magnetic material and a magnetic material layer 127 lining the core 123 along the substantially vertical section 124, with the flow surface 126 being defined along the forward face 127*a* of the magnetic material layer 127. Each mobile deflector 140 also includes a magnet 146 extending along at least a portion of the rear surface 144 of the mobile deflector 140).

One skilled in the art will understand that the different possible alternatives and alternate embodiments described above regarding the elements of the weeping wall 120 herein described in relation to the embodiments shown in FIG. 7, also apply and will not be reiterated herein for the sake of conciseness.

In the embodiment shown in FIG. 7, the selective reconfiguration of the position and/or orientation of the deflectors 140 with regard to the flow surface 126 is performed automatically by an automatic deflector repositioning system 160 configured to automatically reconfigure the deflectors 140 either according to live user commands obtained through a user input device (not shown) or a predetermined reconfiguration sequence.

The automatic deflector repositioning system 160 is an inner mechanism embedded in the core 123 of the weeping wall 120, which cooperates with at least a subset of the deflectors 140 mounted to the flow surface 126, so as to move at least one corresponding deflector 140 on the flow surface 126 according to predetermined patterns (or via a remote-control device or the like). In an embodiment, the automatic deflector repositioning system 160 is positioned within the core 123 of the wall body 122 and extends along a section of the substantially vertical section 124 (i.e. under a section of the flow surface 126 and the corresponding magnetic material layer 127).

For example and without being limitative, in an embodiment, the automatic deflector repositioning system 160 includes magnetic elements being displaced, to magnetically move the deflectors 140 on the flow surface 126 and, for example, periodically rearrange the position and/or orientation of the deflectors 140 (and consequently the appearance of the weeping wall 120). In this embodiment, the automatic deflector repositioning system 160 can include a plurality of magnets (not shown) having sufficient power to create a change in the magnetic field resulting in movement of magnets 146 of corresponding deflectors 140 mounted on the flow surface 126 and a mechanism (not shown) for displacing the magnets (not shown) of the deflector repositioning system 160. For example and without being limitative, the magnets (not shown) of the deflector repositioning system 160 can be operatively connected to rails (not shown) and be movable along the rails (not shown), be mounted onto mechanical arms (not shown), etc. One skilled in the art will understand that, in alternative embodiments, other mechanisms could be provided for displacing the magnets (not shown) of the automatic deflector repositioning system 160.

In view of the above, variation in the magnetic filed created by the movement of the magnets (not shown) of the automatic deflector repositioning system 160, which are positioned in proximity of the flow surface 126 onto which the deflectors 140 are located, will result in movement of the magnetized deflectors 140 movably connected to the flow surface 126.

In FIG. 7, the automatic deflector repositioning system 160 is operatively connected to a controller 162 controlling the operation of the mechanism thereof. In an embodiment, the controller 162 can include a microprocessor, a microcontroller or any other device capable of storing and processing data and generating a control signal based on the processed data. The controller 162 is operatively connected to the deflector repositioning system 160 for controlling the automatic deflector repositioning system 160 to move the deflectors 140 according to a predetermined reconfiguration sequence. In an embodiment, the controller 162 has a memory, with instructions regarding the predetermined reconfiguration sequence being stored in the memory of the controller 162.

In an alternative embodiment, the controller 162 could be operatively connected to (i.e. is in data communication with) an input device (not shown), such that a user can use the input device (not shown) to input reconfiguration instructions for controlling the automatic deflector repositioning system 160 to move the deflectors 140 according to the reconfiguration instructions received by the input device (not shown). For example and without being limitative, in an embodiment, the controller 162 can receive data from the input device, process the data and generates a control signal based on the processed data. The generated control signal is subsequently transmitted to the automatic deflector repositioning system 160, such that control of the operation of the automatic deflector repositioning system 160 is performed through the control signal generated by the controller 162. In the course of the present description, the term "input device" is used to define any device which allows a user to manually operate the device to provide an input indicative of the user intention of controlling the movement of the deflectors 140. For example and without being limitative, the user-controlled control device can be a push-button control device or any other device with controls allowing the user to impart a user command. The user input device can be connected to the controller via a wired or a wireless data connection.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A weeping wall for receiving a continuous flow of a flowable substance, the weeping wall comprising:

a wall body having a flow surface with a magnetic material layer extending along at least a portion thereof, the magnetic material layer having a forward face and including a layer of non-corrosive, non-magnetic material extending along the forward face and defining the flow surface of the wall body;

a flowable substance inlet defined at an upper end of the flow surface, with the flowable substance continuously flowing therefrom and downwardly onto the flow surface;

at least one mobile deflector movably engaged to the flow surface and projecting therefrom, the at least one mobile deflector including a magnet and being magnetically held in place on the flow surface to be selectively movable relative to the flow surface to modify a flow path of the flowable substance on the flow surface; and a flowable substance outlet defined at a lower end of the flow surface with the flowable substance flowing continuously therein after running down onto the flow surface.

2. The weeping wall of claim 1, wherein each one of the at least one mobile deflector is selectively displaceable at least one of vertically and horizontally along the flow surface.

3. The weeping wall of claim 1, wherein each one of the at least one mobile deflector is selectively rotatable about the flow surface.

4. The weeping wall of claim 1, wherein the magnetic material layer is made of non-corrosive magnetic material and has a forward face defining the flow surface of the wall body.

5. The weeping wall of claim 1, wherein the wall body includes a core and a deflector repositioning system embedded within the core along at least a section of the flow surface, the deflector repositioning system cooperating with at least one of the at least one mobile deflector mounted to the flow surface, to move the at least one of the at least one mobile deflector on the flow surface.

6. The weeping wall of claim 1, wherein the wall body includes a core and a deflector repositioning system embedded within the core along at least a section of the flow surface, the automatic deflector repositioning system cooperating with at least one of the at least one mobile deflector mounted to the flow surface, to move the at least one of the at least one mobile deflector on the flow surface.

7. The weeping wall of claim 6, wherein the core is made of non-magnetic material and wherein the automatic deflector repositioning system includes magnetic elements displaceable, to magnetically move the a least one of the at least one deflector on the flow surface.

8. The weeping wall of claim 1, wherein the flowable substance is water.

9. A weeping wall comprising:

a wall body including a magnetic material layer extending along at least a portion of a flow surface receiving a continuous flow of flowable substance running downwardly thereon, the magnetic material layer having a forward face and including a layer of non-corrosive, non-magnetic material extending along the forward face and defining the flow surface of the wall body;

a flowable substance inlet positioned at an upper end of the flow surface and releasing a flow of the flowable substance;

a flowable substance outlet positioned at a lower end of the flow surface and receiving a flow of the flowable substance, the flowable substance outlet being in fluid communication with a reservoir collecting and storing the flowable substance;

a pump constantly moving the flowable substance from the reservoir to the flowable substance inlet;

at least one mobile deflector movably engaged to the flow surface using a magnet and projecting therefrom, each one of the at least one mobile deflector being sized and shaped to disrupt the flow of flowable substance dripping down the flow surface and being magnetically held in place on the flow surface to be selectively movable relative to the flow surface to modify a flow path of the flowable substance on the flow surface.

10. The weeping wall of claim 9, wherein each one of the at least one mobile deflector is selectively displaceable at least one of vertically and horizontally along the flow surface.

11. The weeping wall of claim 9, wherein each one of the at least one mobile deflector is selectively rotatable about the flow surface.

12. The weeping wall of claim 9, wherein the magnetic material layer is made of non-corrosive magnetic material and has a forward face defining the flow surface of the wall body.

13. The weeping wall of claim 9, wherein the weeping wall includes a deflector repositioning system cooperating with at least of the at least one mobile deflector mounted to the flow surface, to move the at least one of the at least one mobile deflector on the flow surface.

14. The weeping wall of claim 9, wherein the wall body includes a core and the weeping wall includes a deflector repositioning system embedded within the core along at least a section of the flow surface, the deflector repositioning system cooperating with at least one of the at least one mobile deflector mounted to the flow surface, to move the at least one of the at least one mobile deflector on the flow surface.

15. The weeping wall of claim 9, wherein the flowable substance is water.

* * * * *